United States Patent
Anantharangachar et al.

(10) Patent No.: US 7,392,300 B2
(45) Date of Patent: Jun. 24, 2008

(54) METHOD AND SYSTEM FOR MODELLING A COMMUNICATIONS NETWORK

(75) Inventors: Raghu Anantharangachar, Karnataka (IN); Basanth Chigatrei Marikenchana Gowda, Karnataka (IN); Arun Rao Poghul, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 730 days.

(21) Appl. No.: 10/753,841

(22) Filed: Jan. 8, 2004

(65) Prior Publication Data

US 2005/0154571 A1 Jul. 14, 2005

(51) Int. Cl.
*G06F 15/177* (2006.01)
(52) U.S. Cl. .......................... 709/220; 703/13; 370/254
(58) Field of Classification Search ......... 709/223–224, 709/220–222; 715/734–735; 703/13; 370/254
See application file for complete search history.

(56) References Cited

U.S. PATENT DOCUMENTS

| | | | | |
|---|---|---|---|---|
| 5,963,943 A * | 10/1999 | Cummins et al. | ............. | 707/10 |
| 2001/0011215 A1 | 8/2001 | Beeker et al. | | |
| 2002/0021675 A1 * | 2/2002 | Feldmann | .................. | 370/254 |
| 2003/0046370 A1 * | 3/2003 | Courtney | .................... | 709/220 |
| 2003/0055883 A1 * | 3/2003 | Wiles, Jr. | .................... | 709/203 |
| 2003/0161266 A1 | 8/2003 | Baccelli et al. | | |
| 2004/0030778 A1 * | 2/2004 | Kronenberg et al. | ........ | 709/224 |
| 2005/0060647 A1 * | 3/2005 | Doan et al. | .................. | 715/514 |
| 2005/0226167 A1 * | 10/2005 | Braun et al. | ................ | 370/254 |
| 2006/0129672 A1 * | 6/2006 | Mayer | ........................ | 709/223 |

* cited by examiner

*Primary Examiner*—Abdullahi Salad

(57) ABSTRACT

A system and method of modelling a communications network using a computer system is disclosed, the method including generating a network representation using computer-readable code that represents structured information; parsing the network representation; generating a network model using the parsed network representation, the network model including a plurality of network objects and relationships between the plurality of network objects; and storing the network model in memory. Any type of network may be modeled. The computer-readable code may be any suitable language or instructions for representing structured information such as, for example, extensible mark-up language (XML). A network inventory adapter receives the network representation from the network. The network inventory adapter is a software component that may be used to connect applications to the network. The network inventory adapter receives the network representation from the network and reads and parses the network representation to determine which network objects are to be operated on and the order of operation.

24 Claims, 5 Drawing Sheets

METHOD AND SYSTEM FOR MODELLING A COMMUNICATIONS NETWORK

FIELD OF THE INVENTION

The present invention relates generally to computer systems, and more specifically, to modelling a communications network using a computer system.

BACKGROUND OF THE INVENTION

Computer networks have become integral to businesses in conducting transactions with both their customers and other businesses. A number of different network systems have been developed for specific applications and to meet the specific needs of users.

On example computer network is a virtual private network (VPN). Virtual private networks provide secure communications over shared or public networks, such as the Internet. The shared network is typically maintained by a service provider such as, for example, an application service provider (ASP), a network service provider (NSP) or an Internet service provider (ISP). Therefore, the users of the virtual private network are not required to commit resources to maintaining and servicing the network. Any number of products, applications, devices, and other objects may be coupled to the virtual private network.

A variety of software products and applications currently exist to facilitate network development, management, and maintenance. Maintaining and troubleshooting a network can be costly and difficult. Often, it is desirable to simulate a communications network prior to actually establishing the network in order to reduce the cost and number of difficulties encountered. However, existing systems and methods have not fully addressed the issues relating modelling communications networks.

SUMMARY OF THE INVENTION

Embodiments provide for a system and method of modelling a communications network. A representation of a communications network may be generated using computer-readable code, the computer-readable code representing structured information about the communications network. The network representation is parsed, generating a network model including a plurality of network objects and relationships between the plurality of network objects. The network model may be stored in memory for further use.

It is to be understood that other aspects of the present invention will become readily apparent to those skilled in the art from the following detailed description where, simply by way of illustration, exemplary embodiments of the invention are shown and described. As will be realized, the invention is capable of other and different embodiments, and its several details are capable of modifications in various respects, all without departing from the invention. Accordingly, the drawings and description are to be regarded as illustrative in nature and not as restrictive.

BRIEF DESCRIPTION OF THE DRAWINGS

These and other features, aspects, and advantages of the present invention will become better understood with regard to the following description and accompanying drawings where.

DETAILED DESCRIPTION

Figure 1:
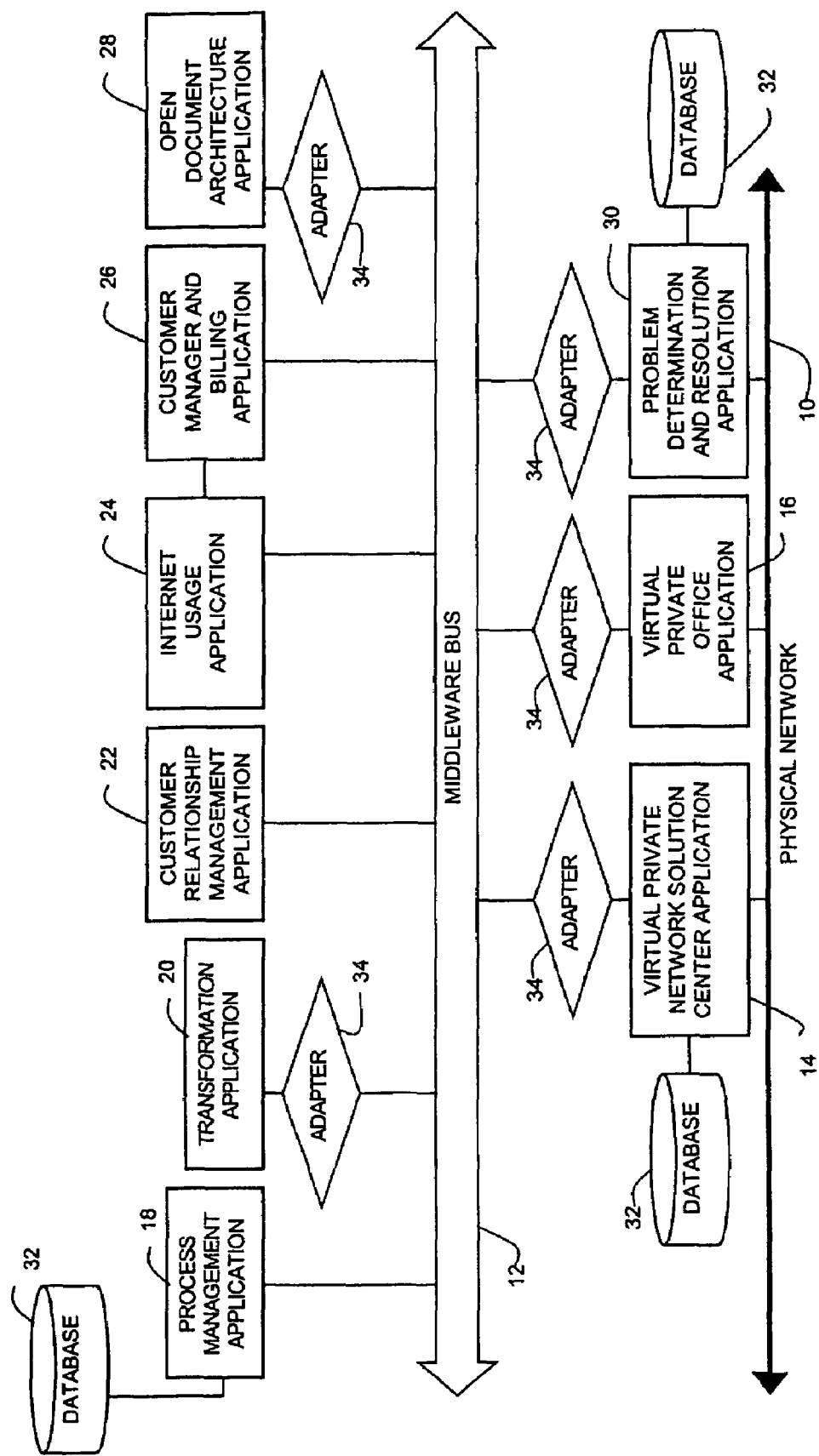
FIG. 1 is an architecture diagram of a data communications network in accordance with an embodiment of the present invention.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

In the following description, reference is made to the accompanying drawings, which form a part hereof, and through which is shown by way of illustration specific embodiments in which the invention may be practiced. It is to be understood that other embodiments may be used as structural and other changes may be made without departing from the scope of the present invention.

The communications network modeled may be any type of network such as, for example, a local area network, wide area network, virtual private network, or any other suitable network configuration. The communications network may include a middleware bus or any other desired software.

The communications network representation may include, but is not limited to, one or more of the following elements in any suitable combination: circuit level index, circuit type identification, order of operation indication, delete circuit identification, underlying circuit index, underlying link index, delete object identification, parent circuit identification, and child circuit identification. The network representation may be generated at startup or reconfiguration or at any other determined time.

Network events may be executed using the communications network representation. The network event may be selected from the group consisting of provisioning, circuit provisioning, service provisioning, switch provisioning, rollback, and delete. However, any other desired network events or received data may be processed using the present invention. The network event may be received from the middleware bus. Processing of the network event may further include identifying one or more of the network objects using the network representation, and determining an order of operation on the one or more network objects using the network representation.

A graphical representation of the network model may be generated and displayed on a display monitor. Also, the graphical representation may include a graphical user interface used that is used to modify the network model and otherwise interact with the network model.

The system may be used to provide end-to-end integrated management capability in the areas functionality, inventory, configuration, accounting, performance and supportability. A service provider may integrate all of the products associated with a particular service lifecycle over a common middleware bus. The system may also be used by the service provider to automate the service lifecycle and manage VPN service offerings.

The system may include a network inventory adapter. In an exemplary embodiment, the network inventory adapter may receive and process the network inventory or network representation. The network inventory adapter is a customizable software component that allows applications to be interfaced with the communications network. The applications may also be interfaced with the network using a middleware bus. Upon receiving events from the network, the adapter reads and parses the network representation to determine which network objects are to be operated on and the order of operation.

One step in creating the network inventory adapter is to understand the network model being used. Network models provide a representation of the various objects that are modeled in the network inventory and also the relationships that exist between these objects. This network model view may depend on the user's particular business or services being provided and also the platform being used, such as DSL, Leased Line, and the like.

The network inventory adapter, in accordance with one embodiment, allows for customization of the network model to suit the user's particular needs while reducing customization time, reducing the dependency of the adapter on the network model, increasing the standards compliance for the network model representation, and increasing the ease of customization.

In one exemplary embodiment, the network inventory provides a mechanism to represent the network model using a standards compliant representation such as, for example, XML. The XML representation also allows the customer to specify the entire data model, define their own tags, and therefore define the model in such a way that the data model can be tailored to their particular use, and define the operations that are specified in the XML document.

In another exemplary embodiment, the network inventory adaptor may read and parse the XML file upon startup or reconfiguration and store a representation of the network model in memory. The adapter may also refer to the XML document representation while performing operations on the objects in the network inventory, the operations including, but not limited to, provisioning, rollback, and delete. The network inventory adapter may refer to the XML representation to decide on what objects need to be deleted and/or rolled-back and also decide on the order of operation on the objects. The network inventory adapter may also receive events from the middleware bus to provision a specific scenario in the network inventory.

Using the XML representation to arrive at a flexible and easily configurable data model, the system may provide the following desirable outcomes: reduction in the customization time, reduction in the development/customization cost for the user, and improvement in the performance of the network inventory adapter as the adapter becomes a thin adapter. Furthermore, compliance to the XML standards helps the system become more widely usable.

One embodiment provides generally for a system and method of performing operations on a communications network using a network inventory. In an exemplary embodiment, the network inventory is a collection of the different objects in the network and their interrelationships. These objects represent the various physical or logical entities that exist in the network. For example, these objects may represent entities including, but not limited to, computers, terminals, servers, storage devices, database, routers, switches, printers, communications lines, circuits, and other telecommunications media and devices. The network inventory may also depict the way the various relationships are created among the objects on the network. A representation of the network inventory may be created using extensible markup language (XML). An XML document representing the network inventory may be generated automatically by a computer application that queries objects on the network or manually by a user of the system. A network model may be a logical model or a representation of objects in the network inventory and their interrelationships. The network model may be created and/or stored in memory in any suitable format including, but not limited to, text, markup languages, programming languages, database languages, graphical representation, and any other computer-readable format. In one embodiment, a network model of the network may be generated using the XML representation.

Referring now to FIG. 1, an architecture diagram of a data communications network, in accordance with an embodiment, is shown. In the illustrated embodiment, a physical network 10 may be a public or shared network such as the Internet or other network. A middleware bus 12 or messaging bus is established as a virtual private network on the physical network 10. The virtual private network is established by way of the virtual private network solution centre application 14 and the virtual private office application 16. Virtual private networks are known to those skilled in the art and may be established using any suitable method or products. One suitable product is the Virtual Private Network Solutions Center (VPNSC) available from Cisco Systems, Inc. While the illustrated embodiment includes a middleware bus and a virtual private network, embodiments may operate on any network configuration including, but not limited to, both private and public networks, bus architectures, and hub-and-spoke architectures. Communications over the network may be made using any suitable network communication protocol.

A plurality of sample applications are coupled to the middleware bus 12, including a process management application 18, a data transformation application 20, a customer relationship management application 22, an Internet usage application 24, a customer manager and billing application 26, an open document architecture application 28, and a problem determination and resolution application 30. Exemplary applications are available from Hewlett Packard under the product names Internet Usage Manager (IUM), Order Details Agent (ODA), and Product Details Repository (PDR). One or more databases 32 may be provided as memory for applications on the data communications network. Also, the network may have one or more databases to serve as a central storage device for the network that may be accessible by any application on the network. The process management application 18 generally retains the control on the entire application or product set. An exemplary suitable process manager application is the HP Process Manager (HPPM) available from the Hewlett-Packard Company. The process management application 18 sequences the various activities to be performed, ensures that the status is adequately checked, and performs retries if necessary.

The process management application 18, the open document architecture application, the virtual private network solution centre application 14, and the virtual private office application 16 are each coupled to the middleware bus 12 using a network inventory adapter 34. In an exemplary embodiment, the network inventory adapter 34 is a software component that allows the applications to be interfaced with the middleware bus 12. The network inventory adapter 34 may be used as the network interface for any application that is suited to the functionally provided by the adapter 34. The adapters 34 may provide the capability to convert the data and events from the middleware format to the application format and, conversely, from the application format to the middleware format. The adapters 34 may support specific operations and allow for various operations to be triggered by certain events and commands. The adapters 34 may also transmit and receive the network inventory over the data communications network.

Figure 2:
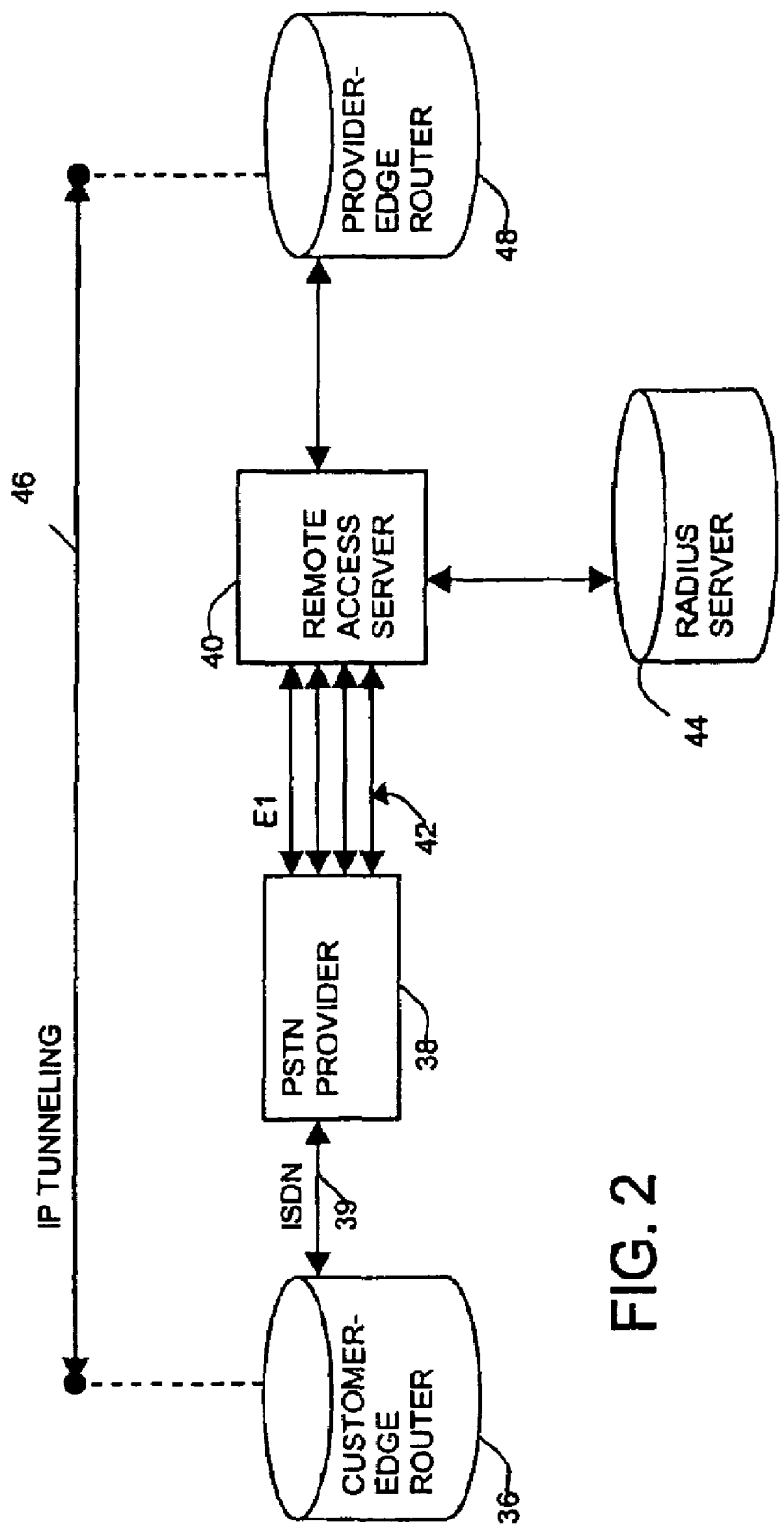
FIG. 2 is an object diagram of a network model for a local area network dial-in access server in accordance with an embodiment of the present invention.

FIG. 2 is an object diagram of a network model for a local area network (LAN) dial-in access server in accordance with an embodiment. The network model is shown using an exemplary graphical illustration. For example, in the case of an ISP providing dial-in access as a service, the logical model would represent the various objects for this scenario, such as a remote access server (RAS) 40 and a customer edge router 36, and the way that circuits are created between these objects. The customer edge router 36 connects with a PSTN (public switched telephone network) provider 38. The customer edge router 36 may be connected using other suitable transmission mediums and communication protocols including, but not limited to, integrated services digital network (ISDN), fiber distributed data interface (FDDI), T-carrier systems, and E-carrier systems. The PSTN provider provides access to the RAS 40. In the illustrated embodiment, access to the RAS 40 is provided using and E1 carrier lines 42, however other carrier systems may be used. Any number of carrier lines 42 may be used. The RAS 40 may validate the received request using a Remote Authentication Dial-In User Service (RADIUS) server 44 or other authentication service. If authentication is successful, the RAS creates an IP tunnel 46 between the customer edge router 36 and the provider edge router 48. In an exemplary embodiment, a GRE tunnelling protocol, developed by Cisco Systems, Inc., may be used to create the IP tunnel 46.

A representation of the above example scenario would be available from the network inventory. Using a graphical user interface (GUI) with the network inventory, it is possible to view the network model as a whole, as well view and/or modify the various properties and attributes of the various objects.

Figure 3:
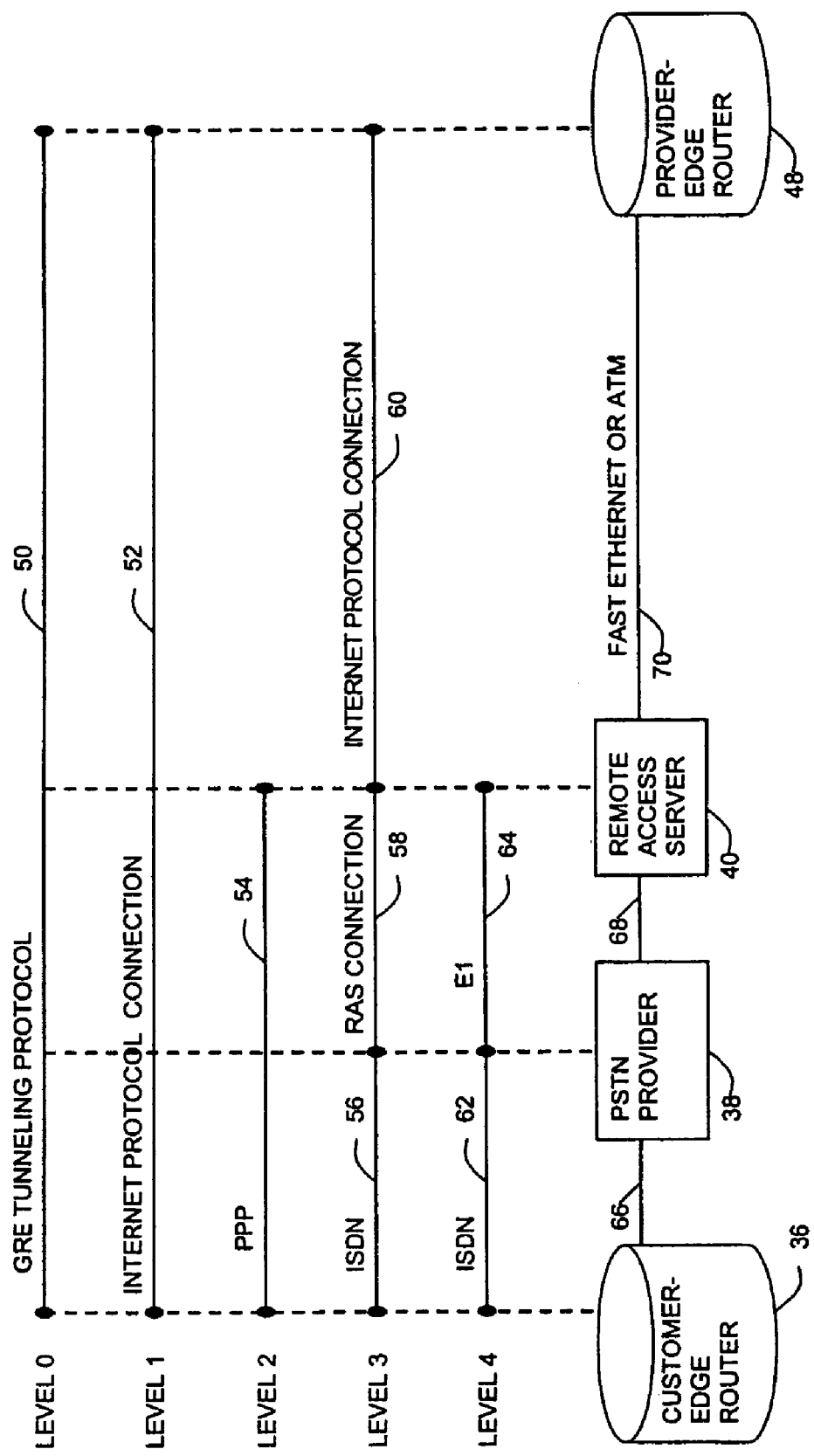
FIG. 3 is a circuit view diagram of the network model shown in FIG. 2.

FIG. 3 is a circuit view diagram of the network model shown in FIG. 2. Circuit levels are measured relative to the top circuit level. For example, referring to FIG. 3, the GRE tunnelling protocol 50 is at level zero (0), the Internet protocol connection 52 is at level one (1), the point-to-point protocol (PPP) 54 is at level two (2), the ISDN connection 56, the RAS connection 58, and the Internet protocol connection 60 are at level three (3), and the ISDN connection 62 and the E1 carrier 64 are at level four (4). At the link level, the customer edge router 36 and the PSTN provider 38 may be coupled by a suitable physical link 66, the PSTN provider 38 and RAS 40 may be coupled using a suitable physical link 68, and the RAS 40 and provider edge router 48 may be coupled using a fast Ethernet or asynchronous transfer mode protocol (ATM) 70.

Figure 4:
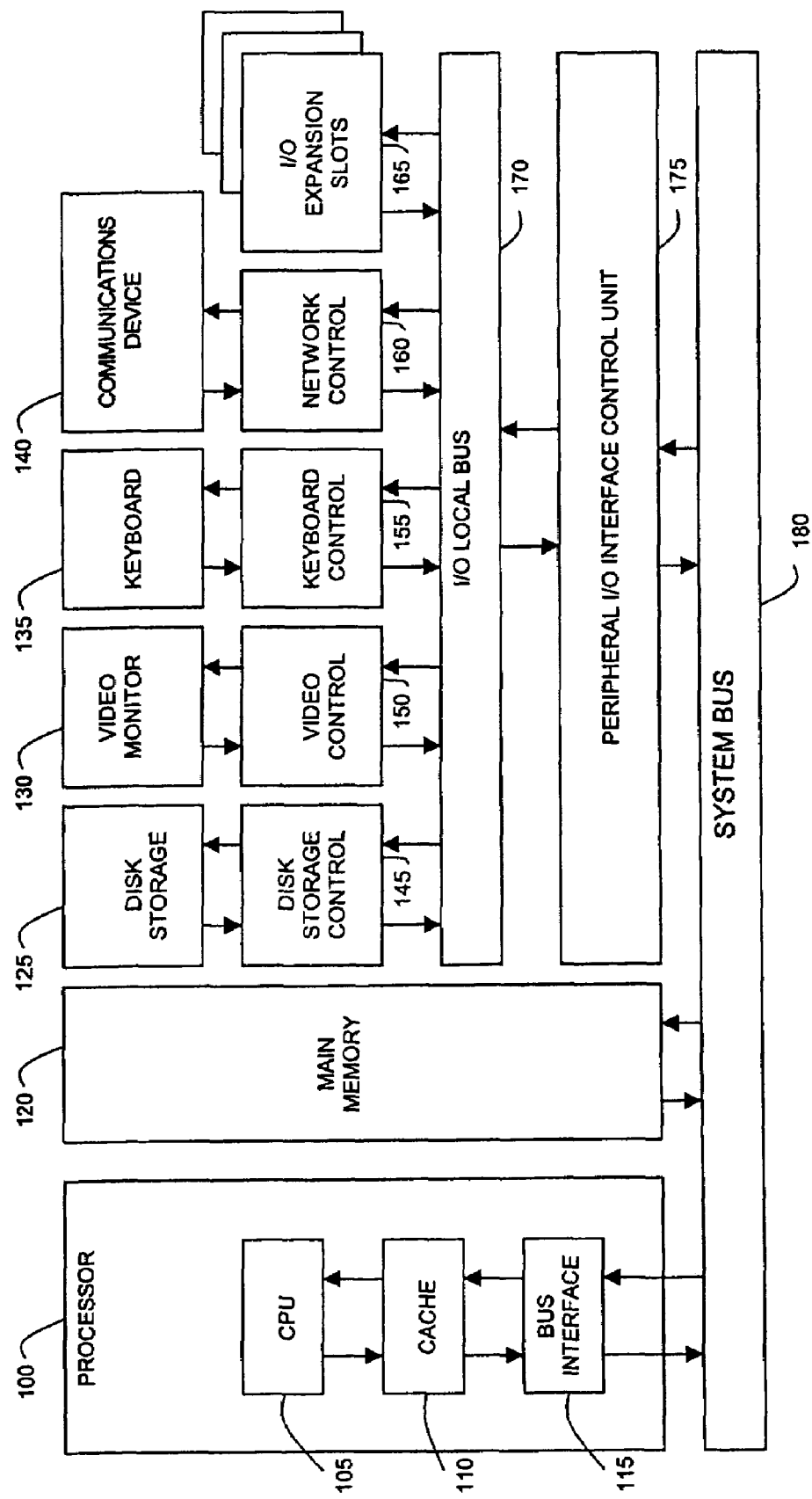
FIG. 4 is a block diagram of an exemplary architecture for a general purpose computer suitable for operating the presently described system and related network applications, in accordance with an embodiment of the present invention.

FIG. 4 is a block diagram of an exemplary architecture for a general purpose computer suitable for operating the presently described system, in accordance with an embodiment. The illustrated general purpose computer may also be suitable for running other network applications. A microprocessor 100, including of a central processing unit (CPU) 105, a memory cache 110, and a bus interface 115, is operatively coupled via a system bus 180 to a main memory 120 and an Input/Output (I/O) control unit 175. The I/O interface control unit 175 is operatively coupled via an I/O local bus 170 to a disk storage controller 145, video controller 150, a keyboard controller 155, a network controller 160, and I/O expansion slots 165. The disk storage controller 145 is operatively coupled to the disk storage device 125. The video controller is operatively coupled to the video monitor 130. The keyboard controller 155 is operatively coupled to the keyboard 135. The network controller 160 is operatively coupled to the communications device 140. The communications device 140 is adapted to allow the system and related applications operating on the general purpose computer to communicate with a communications network, such as the Internet, a Local Area Network (LAN), a Wide Area Network (WAN), a virtual private network, or a middleware bus, or with other software objects over the communications network.

Computer program instructions for implementing features of the presently described system may be stored on the disk storage device 125 until the processor 100 retrieves the computer program instructions, either in full or in part, and stores them in the main memory 120. The processor 100 then executes the computer program instructions stored in the main memory 120 to implement the features of the network inventory adapter and the present invention. The program instructions may be executed with a multiprocessor computer having more than one processor.

The general purpose computer illustrated in FIG. 4 is an example of a one device suitable for use with the present invention. The described system, the network inventory adapter 34, and other associated applications may also run on a network server or other suitable computers and devices.

Figure 5:
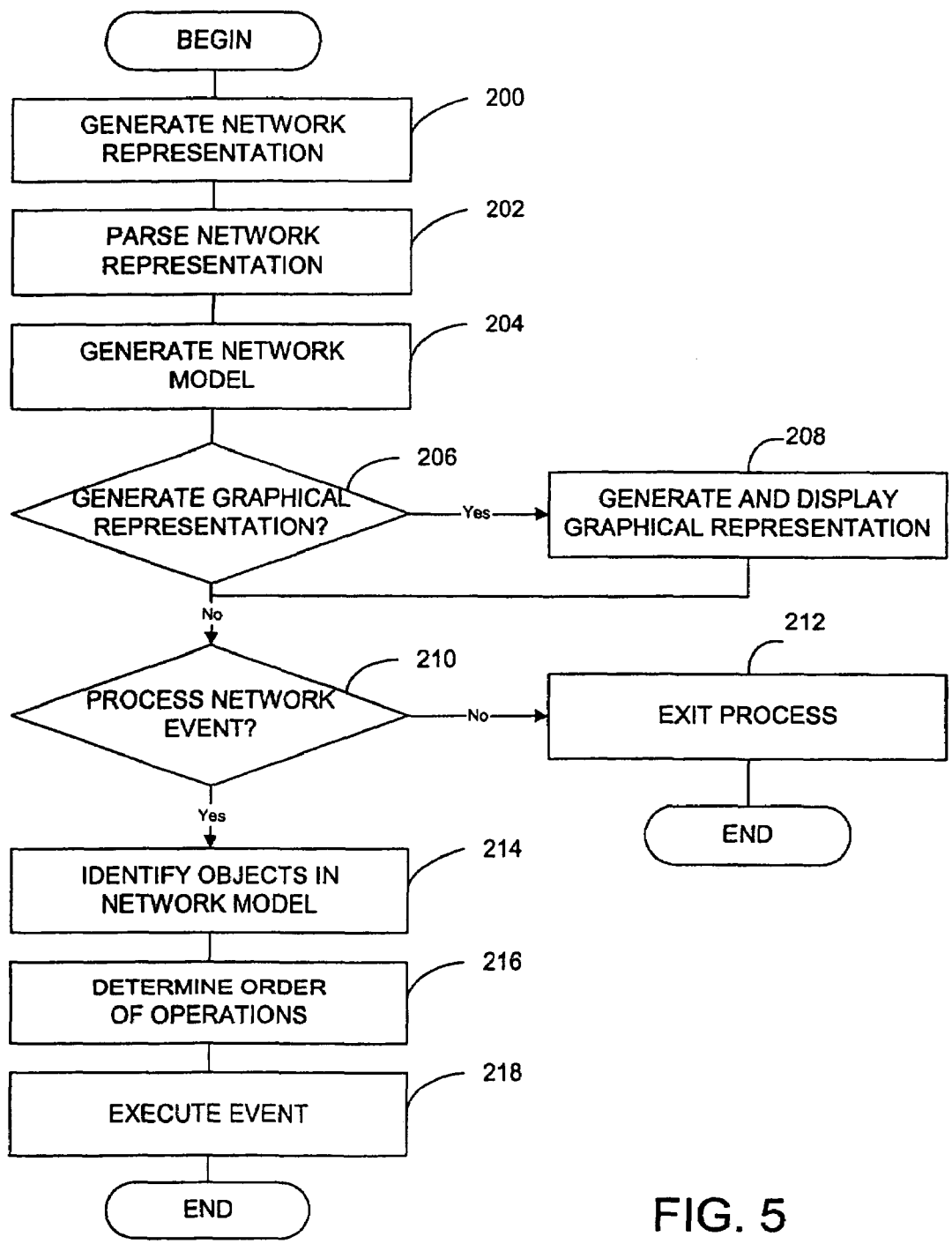
FIG. 5 is a flow diagram of an example process for modelling a communications network, in accordance with an embodiment of the present invention.

FIG. 5 is a flow diagram of an example process for modelling a communications network, in accordance with an embodiment. In step 200, the network representation is generated. In one embodiment, the network representation is an XML document but may be created and/or stored in memory in any suitable format including, but not limited to, text, markup languages, programming languages, database languages, graphical representation, and any other computer-readable format. The network representation may be generated automatically by a computer application or manually by a user of the system. The network representation may include a representation of objects in the network and their relationships. In step 202, the network representation is parsed. The parsed network representation is used to generated a network model, step 204. In step 206, the system determines whether a graphical representation of the network is to be generated. If yes, then the graphical representation of the network is generated and displayed to a screen or other output, step 208. If no, then the system determines whether an event is to be processed, step 210. If no, then the system exits the process, step 212. If yes, then the system identifies the needed objects in the network model, step 214. In step 216, the system determines the order of operations needed to process the network event. In step 218, the system then executes the event as required.

An example of a rollback implementation is herein described. A rollback is the restoring of the status of the network inventory whenever a network operation or provision operation fails. The rollback implementation may be automated to execute when an operation fails. In an exemplary rollback execution, the XML representation may used to identify the various objects that need to be deleted and/or rolled-back. Use of the XML representation helps ensure that the pre-provisioned data is not removed from the ISP. This pre-provisioned data may be defined as part of the network model. For example, the pre-provisioned data may include a third party cloud, which is used to offer dial-in access. In an exemplary embodiment, this type of object should not be deleted/rolled-back, as it is not provisioned as part of the process flow. This type of data is identified in the XML data file given below.

Exemplary XML code including specifications for the rollback activities is as follows:

```
<?xml version="1.0" encoding="ISO-8859-1"?>
<!DOCTYPE UpdateAndRollBack (View Source for full doctype...)>
<UpdateAndRollBack>
    <Circuit index="3" Type="ISDN S0 Bearer" DeleteCircuit="YES"
        UnderlyingCircuitsIndex="NA" UnderlyingLinkIndex="NA"
        UseSame="NA" Delete="" />
    <Link Index="3" DeleteLink="Yes" ModifyPort="StartPortName"
        AssociatedNode="StartNodeName" DeleteDevice="NA" I>
    <ISDN>
        <Variant Type="GRE">
            <Circuit index="0" Type="GRE" DeleteCircuit="Yes"
                UnderLyingCircuitsIndex="1" UnderlyingLinkIndex="NA"
                UseSame="NA" Delete="Loopback" />
            <Circuit index="1" Type="IP Connectivity"
                DeleteCircuit="Yes" UnderlyingCircuitsIndex="2"
                UnderlyingLinkIndex="NA" UseSame="DestNodeName"
                Delete="NA" />
            <Circuit index="2" Type="PPP" DeleteCircuit="Yes"
                UnderlyingCircuitsIndex="3,4" UnderlyingLinkIndex="NA"
                UseSame="DestNodeName" Delete="NA" />
            <Circuit index="3" Type="RAS Connection"
                DeleteCircuit="NO" UnderlyingCircuitsIndex="NA"
                UnderlyingLinkIndex="NA" UseSame="SourceNodeName"
                Delete="NA" />
            <Circuit index="4" Type= "ISDN Connection"
                Deletecircuit="Yes" UnderlyingCircuitsIndex="PP"
                UnderlyingLinkIndex="NA" UseSame="DestNodeName"
                Delete="NA" />
        </Variant>
    </ISDN>
</UpdateAndRollBack>
```

The above XML code captures the network model from the top most circuit level to link level. 'Circuit index' identifies the circuit level in terms of distance from the top level. In the model shown in FIG. 3, the GRE tunneling connection is the topmost level, therefore, having an index of zero (0). The Index field identifies the order in which the circuits are to be deleted. 'Type' is a reference field that may be used to identify the type of circuit. 'DeleteCircuit' identifies whether or not a particular circuit needs to be deleted. This field is used since certain circuits may not need to be deleted, such as circuits used in multiple models or circuits that may be part of a backbone. 'UnderlyingCircuitsIndex' identifies the index of the underlying circuits. If multiple underlying circuits exist, commas may be used to separate them. In the model illustrated, there may be multiple ISDN bearer circuits, which are represented as parallel paths using "PP." 'UnderlyingLinkindex' identifies whether or not the circuit has an underlying link. If an underlying link exists, the underlying link index has numerical value identifying the order in which it is to be deleted. Otherwise, the field has the value "NA" (Not Applicable). 'UseSame' identifies a common point for the child and parent circuit. The field may have values such as 'StartNodeName' or 'EndNodeName.' These values may be used to identify the correct child circuit or parent circuit. 'Delete' identifies the objects and attributes to be deleted when the particular circuit is deleted.

When the adapter receives an event to rollback a line, the adapter gets a Service Instance ID (SIID) as input. For this particular SIID, the associated circuits are retrieved and the correct circuit is chosen. The XML file is parsed and the correct variant is identified using the input values. For this particular illustrated variant, the first circuit node index is retrieved and this will be the circuit with index zero (0). All of the circuits or links found are stored in a Hashtable with index as the key and the circuit or link name as the value. Similarly, underlying circuits are retrieved and, based on the 'UseSame' attributes value, they are stored with the appropriate index.

When the Underlying circuit has value 'PP,' the Circuit Node under <UpdateAndRollBack> whose value is equal to the number of parallel circuits, in this case:

```
<Circuit index="3" Type="ISDN S0 Bearer" DeleteCircuit="YES"
    UnderlyingCircuitsIndex="NA"    UnderlyingLinkIndex="NA"
    UseSame="NA" Delete="" />,
``` is duplicated and added in the memory. Note that these nodes may not exist in the actual XML document. These nodes may not exist in the XML document because the number of parallel paths varies and therefore it is easy to manage in memory rather than having to code it in the XML document. The index value is increased accordingly. Similarly, depending on the requirements, other attributes can also be modified.

After all the circuits and links have been stored, the tree is traversed again and deletion starts. If the DeleteCircuit or DeleteLink attribute is "YES," then the circuit object or link object corresponding to the index is retrieved. This index is the key for the Hashtable. If any objects associated with this circuit or link are to be deleted, they are then deleted. After the associated objects are deleted, the circuit or link is deleted. This is known by the attribute Delete="Loopback".

The above XML document is an example of how any desired operation such as, for example, provisioning, assurance, usage, modify, delete, and rollback, may be performed. The XML tags are interpreted upon input into the system. Therefore, the XML document may create a different result depending on how the XML document is interpreted. For example, if the system is provisioning a network model, then system interprets the xml accordingly and builds the network model in the database. If the system is performing a delete or rollback, then the code may produce the reverse operation and delete or roll back the network model, or elements of the network model, in memory.

In accordance with one embodiment of the invention, the network environment illustrated in FIGS. 2 and 3, and any other desired network configuration, can be modeled and/or manipulated using the present invention. In one embodiment, the model is generated in a network database. Furthermore, the model can be used for any service function such as, for example, provisioning, assurance, usage, modify, delete, and rollback. One example for provisioning is to use the network model to provision the various network elements, set-up logical connections between the various network elements, and activate the physical connections. One example of assurance is to use the network model to indicate the location of a fault and monitor the network environment. The fault, for example, could be displayed on in a different color on the display monitor. One example of usage is to use the network model to correlate the statistics from the mediation devices and/or mediation software, as well from third party providers. The network model can also be used to provide billing details associated with each object or a group of segments, sub-networks, equipment, and/or circuits. In summary, the network model provides a system such as, for example, a single-window system for performing any of the various operations of the service provider.

Those skilled in the art will appreciate that the above-described system may be implemented in a variety of configurations. For example, while particular communications protocols are specified, any suitable communications protocols and communications media may be used. For example, communications lines may include ISDN lines, ADSL lines, DSL lines, T-carrier lines, E-carrier lines, wireless communication, such as infrared or RF-based wireless communication, and the like. Also, while certain communications protocols may have been specified, those skilled in the art will recognize that other suitable communications protocols may be used with the present invention.

While some of the exemplary embodiments disclosed refer primarily to a plurality of objects on a communications network, the present invention may be incorporated into other computer applications that do not require a computer network. For example, the present invention may be used to represent a database and perform operations on the database. Additionally, XML is one exemplary language that may be used to create such the representation of objects on the network. This representation of objects on the network may be created in any other suitable languages, such as wireless markup language (WML), custom representations, and the like. In one embodiment, the language or instructions used is computer-readable code that is capable of representing structured information.

The previous description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

What is claimed is:

1. A method of modelling a communications network using a computer system, the method including:
    generating a network representation using computer-readable code, the computer-readable code representing structured information;
    parsing the network representation;
    generating a network model using the parsed network representation, the network model including a plurality of network objects and relationships between the plurality of network objects;
    storing the network model in memory; and
    processing a network event using the network model, wherein the processing includes identifying one or more network objects of the plurality of network objects, and the processing further includes determining an order of operation on the one or more network objects.

2. A method according to claim 1 wherein the network representation includes at least one of the following:
    circuit level index;
    circuit type identification;
    order of operation indication;
    delete circuit identification;
    underlying circuit index;
    underlying link index;
    delete object identification;
    parent circuit identification; and
    child circuit identification.

3. A method according to claim 1 wherein the network representation is generated at startup.

4. A method according to claim 1 wherein the network representation is generated at reconfiguration.

5. A method according to claim 1 wherein the network event comprises at least one of provisioning, circuit provisioning, service provisioning, switch provisioning, rollback, and delete.

6. A method according to claim 1 wherein the network model includes a middleware bus.

7. A method according to claim 1 wherein the computer-readable code is in extensible mark-up language (XML).

8. A method according to claim 1, further including:
    generating a graphical representation of the network model; and
    displaying the graphical representation on a display monitor.

9. A method according to claim 8 wherein the graphical representation is a graphical user interface, and wherein the graphical user interface is used to modify the network model.

10. A method of modelling a communications network using a computer system, the method including:
    generating a network representation in extensible mark-up language (XML);
    parsing the network representation;
    generating a network model using the parsed network representation, the network model including a plurality of network objects and relationships between the plurality of network objects;
    storing the network model in memory; and
    processing a network event using the network model, wherein processing the network event includes identifying one or more of the plurality of network objects, and determining an order of operation on the one or more of the the plurality of network objects.

11. A system for modelling a communications network, the system including:
    one or more processors;
    one or more memories coupled to the one or more processors; and
    program instructions stored in the one or more memories, the one or more processors being operable to execute the program instructions, the program instructions including:
        generating a network representation using computer-readable code;
        parsing the network representation;
        generating a network model using the parsed network representation, the network model including a plurality of network objects; and
        storing the network model in the one or more memories;
        processing a network event using the network model, wherein processing the network event includes identifying one or more network objects of the plurality of network objects, and determining an order of operation on the one or more network objects.

12. A system according to claim 11 wherein the computer-readable code is in extensible mark-up language (XML).

13. A system according to claim 11 wherein the network representation is generated at startup.

14. A system according to claim 11 wherein the network representation is generated at reconfiguration.

15. A system according to claim 11 wherein the network model includes a middleware bus.

16. A system according to claim 11 wherein the program instructions further include:

generating a graphical representation of the network representation; and displaying the graphical representation on a display monitor.

17. A system according to claim 16 wherein the graphical representation is a graphical user interface, and wherein the graphical user interface is used to modify the network model.

18. A system for modelling a communications network, the system including:

one or more processors;

one or more memories coupled to the one or more processors; and program instructions stored in the one or more memories, the one or more processors being operable to execute the program instructions, the program instructions including:

generating a network representation in extensible markup language (XML);

parsing the network representation;

generating a network model using the parsed network representation, the network model including a plurality of network objects and relationships between the plurality of network objects; and processing a network event using the network model, wherein processing the network event includes identifying one or more of the plurality of network objects, and determining an order of operation on the one or more of the plurality of network objects.

19. A system according to claim 18 wherein the network event is selected from the group consisting of provisioning, rollback, and delete.

20. A system according to claim 18 wherein, to process the network event, the program instructions further include:

identifying one or more of the network objects in the network model; and determining an order of operation on the one or more network objects.

21. A computer program product for modelling a communications network, the computer program product including a computer usable storage medium having computer readable code embodied in the computer usable storage medium, the computer readable code including instructions to:

generate a network representation, the network representation representing structured information;

parse the network representation; and generate a network model using the parsed network representation, the network model including a plurality of network objects and relationships between the plurality of network objects; and process a network event using the network model, wherein processing the network event includes identifying one or more network objects of the plurality of network objects, and further includes determining an order of operation on the one or more of the plurality of network objects.

22. A computer program product according to claim 21, the computer readable code further including instructions to generate a graphical representation of the network model; and display the graphical representation on a display monitor.

23. A computer program product according to claim 22 wherein the graphical representation is a graphical user interface, and wherein the graphical user interface is used to modify the network model.

24. An apparatus for modelling a communications network using a computer system, the apparatus including:

means for representing a plurality of network objects and relationships between the plurality of network objects on the communications network;

means for generating a network model using the representing means, the network model including the plurality of network objects and relationships between the plurality of network objects on the communications network;

means for storing the network model; and means for processing a network event using the network model, wherein processing the network event includes identifying one or more network objects of the plurality of network objects, and further includes determining an order of operation on the one or more of the plurality of network objects.

* * * * *

UNITED STATES PATENT AND TRADEMARK OFFICE
CERTIFICATE OF CORRECTION

| | | |
|---|---|---|
| PATENT NO. | : 7,392,300 B2 | Page 1 of 1 |
| APPLICATION NO. | : 10/753841 | |
| DATED | : June 24, 2008 | |
| INVENTOR(S) | : Raghu Anantharangachar et al. | |

It is certified that error appears in the above-identified patent and that said Letters Patent is hereby corrected as shown below:

In column 10, line 35, in Claim 10, delete "the" before "plurality".

Signed and Sealed this

Thirtieth Day of September, 2008

JON W. DUDAS
*Director of the United States Patent and Trademark Office*